US008837651B2

(12) United States Patent
Jeon

(10) Patent No.: US 8,837,651 B2
(45) Date of Patent: Sep. 16, 2014

(54) APPARATUS AND METHOD FOR ESTIMATING A CHANNEL IN BROADBAND WIRELESS ACCESS SYSTEM

(75) Inventor: Jae-Hoon Jeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1203 days.

(21) Appl. No.: 11/844,243

(22) Filed: Aug. 23, 2007

(65) Prior Publication Data
US 2008/0049814 A1 Feb. 28, 2008

(30) Foreign Application Priority Data

Aug. 28, 2006 (KR) .............................. 2006-0081446

(51) Int. Cl.
*H04B 1/10* (2006.01)
*H04L 25/02* (2006.01)
*H04L 25/03* (2006.01)
*H04L 27/26* (2006.01)

(52) U.S. Cl.
CPC ... *H04L 25/0232* (2013.01); *H04L 2025/03547* (2013.01); *H04L 27/2647* (2013.01); *H04L 25/0256* (2013.01); *H04L 2025/03726* (2013.01)
USPC ........... 375/350; 375/346; 375/316; 375/147; 375/148; 375/232; 375/344; 370/320; 370/335; 370/342; 370/441; 370/290; 370/291

(58) Field of Classification Search
USPC ......... 375/350, 346, 316, 147, 148, 232, 344; 370/320, 335, 342, 441, 290, 291
See application file for complete search history.

(56) References Cited

U.S. PATENT DOCUMENTS

| | | | | |
|---|---|---|---|---|
| 5,250,938 A * | 10/1993 | DiSanto et al. | ............... | 345/107 |
| 6,181,794 B1 * | 1/2001 | Park et al. | ................ | 379/406.08 |
| 2005/0122893 A1* | 6/2005 | Guduru et al. | ................ | 370/201 |
| 2006/0013292 A1* | 1/2006 | Despain | ........................ | 375/152 |
| 2006/0128326 A1* | 6/2006 | Pietraski | ....................... | 455/130 |
| 2007/0081584 A1* | 4/2007 | Alessandro | ................... | 375/232 |

FOREIGN PATENT DOCUMENTS

KR 1020000066459 11/2000

OTHER PUBLICATIONS

Elena Simon Lohan and Markku Renfors, Novel Adaptive Filter for Fading Channel Estimation in Coherent CDMA Receivers, 2004, IEEE, vol. 4, pp. 800-802.*

* cited by examiner

*Primary Examiner* — Zewdu Kassa
(74) *Attorney, Agent, or Firm* — The Farrell Law Firm, P.C.

(57) ABSTRACT

An apparatus and a method for estimating a channel in a broadband wireless access system. A receiving apparatus includes a first channel estimation filter having a tap coefficient which is channel-adaptively variable, the first channel estimation filter acquiring a channel impulse response by filtering received pilot symbols, a second channel estimation filter having a fixed tap coefficient, the second channel estimation filter acquiring a channel impulse response by filtering received pilot symbols, and a selector which selects the operation of one of the first and the second channel estimation filters according to channel correlativity.

15 Claims, 4 Drawing Sheets

APPARATUS AND METHOD FOR ESTIMATING A CHANNEL IN BROADBAND WIRELESS ACCESS SYSTEM

PRIORITY

This application claims priority under 35 U.S.C. §119 to an application filed in the Korean Intellectual Property Office on Aug. 28, 2006 and assigned Serial No. 2006-81446, the contents of which are incorporated herein by reference.

BACKGROUND OF THE INVENTION

1. Field of the Invention

The present invention generally relates to a receiving apparatus and method of a broadband wireless access system, and more particularly, to a hybrid channel estimating apparatus which considers both the complexity and performance of Orthogonal Frequency Division Multiplexing (OFDM)-based system, and a method thereof.

2. Description of the Related Art

Among many wireless communication schemes proposed for high-speed mobile communications, OFDM is considered to be the most prominent candidate for the next-generation wireless communication technology. OFDM is expected to be used in most of the 4-generation wireless communications, and has been selected as the standards for the Wireless Metropolitan Area Network, 802.16, which is so-called 3.5-G technology.

An OFDM-based broadband wireless access system provides improved performance by use of coherent detection of accurate channel estimation. Accuracy in channel estimation is a very important factor, especially in order to incorporate an advanced mobile communication scheme using an instantaneous channel characteristic which is currently under active research. Channel estimation, as used herein, refers to estimating channel impulse response, and an OFDM system estimates channel impulse response by use of filtering of pilots arranged in 2-dimensional time and frequency domains.

A 2-dimension Wiener channel estimation filtering is currently the most optimum pilot-based channel estimation scheme. Wiener channel estimation filtering minimizes Minimum Mean Square Error (MMSE), and provides optimum channel estimation, by appropriately adjusting a tap coefficient according to a channel condition. However, Wiener channel estimation filtering has a drawback of high complexity of computation, because computations, such as matrix inverse operation, to obtain the most suitable filter tap coefficient, and complicated multiplications during the filtering process, are necessary, and this subsequently causes high hardware complexity. A 2×1 dimension Wiener channel estimation filtering has been proposed to overcome the above drawback. The 2×1 dimension Wiener channel estimation filtering uses two joint 1-dimension Wiener channel estimation filters to provide low complexity as well as the similar channel estimation performance as the Wiener channel estimation filtering. However, computational complexity increases as the number of Wiener channel estimation filters, or filter taps increases.

In order to overcome the problems mentioned above, relatively simpler interpolation filtering, such as Lagrange or Spline interpolation, can be used. Unlike the Wiener filtering, which adaptively changes a filter parameter according to a channel condition, schemes such as Lagrange or Spline interpolation use fixed filter parameter, irrespective of the channel condition. Therefore, complexity can be minimized. However, severe performance degradation is experienced under certain channel environments.

As explained above, a Wiener channel estimation filter operates adaptively according to channel status and thus provides optimum performance. However, it is difficult to fully utilize this scheme due to high complexity. Interpolation filters are relatively simpler to construct, but these do not ensure appropriate level of channel estimation performance. Accordingly, a channel estimation scheme, which can provide a tradeoff between complexity and channel estimation quality, is necessary.

SUMMARY OF THE INVENTION

The present invention substantially solves at least the above problems and/or disadvantages and provides at least the advantages below. Accordingly, an aspect of the present invention is to provide an apparatus and a method for hybrid channel estimation in a broadband wireless access system, which provides a tradeoff between complexity and channel estimation quality.

Another aspect of the present invention is to provide an apparatus and a method for selectively using a channel adaptive estimation filter and an interpolation type of channel estimation filter in a broadband wireless access system.

Still another aspect of the present invention is to provide an apparatus and a method for adaptively changing a channel estimation scheme according to channel status in a broadband wireless access system.

Yet another aspect of the present invention is to provide an apparatus and a method for acquiring a channel impulse response using an interpolation filter and a Moving Average (MA) in a broadband wireless access system.

One aspect of the present invention provides a receiving apparatus of a broadband wireless access system, the apparatus including a first channel estimation filter having a tap coefficient which is channel-adaptively variable, the first channel estimation filter acquiring a channel impulse response by filtering received pilot symbols, a second channel estimation filter having a fixed tap coefficient, the second channel estimation filter acquiring a channel impulse response by filtering received pilot symbols, and a selector which selects operation of one of the first and the second channel estimation filters according to channel correlativity.

Another aspect of the present invention provides a receiving method of a broadband wireless access system, the method including measuring a channel correlativity, acquiring a channel impulse response by filtering received pilot symbols using a first channel estimation filter having a tap coefficient which is channel-adaptively variable when the channel correlativity is below a threshold, and acquiring a channel impulse response by filtering received pilot symbols using a second channel estimation filter having a fixed tap coefficient when the channel correlativity is above the threshold.

Still another aspect of the present invention provides a receiving method of a broadband wireless access system, the method including computing a channel estimation error of a first channel estimation filter having a tap coefficient which is channel-adaptively variable, and computing a channel estimation error of a second channel estimation filter having a fixed tap coefficient, selecting a smaller one of the computed channel estimation errors, and selecting a channel estimation filter corresponding to the smaller channel estimation error, and acquiring a channel impulse response, by filtering received pilot symbols using the selected channel estimation filter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

Additionally, while terms may be defined based on the particular functions of the present invention, certain terms may be interpreted according to the purposes of user or operator, or according to the practice. Therefore, terms will be rather defined based on the entire description of the present invention.

A scheme for a broadband wireless access system to adaptively select an appropriate channel estimation according to channel status, will be explained below.

Figure 1:
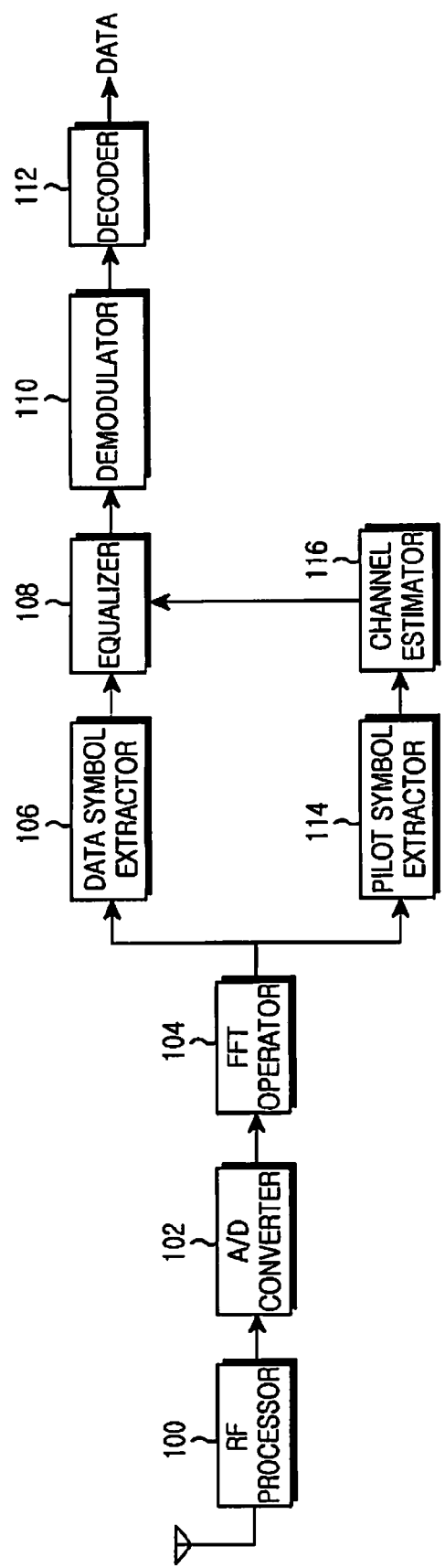
FIG. 1 is a block diagram of a receiver of a broadband wireless access system according to the present invention.

FIG. 1 shows a receiver of a broadband wireless access system according to the present invention.

Referring to FIG. 1, a receiver may include a Radio Frequency (RF) processor 100, an Analog-to-Digital (A/D) converter 102, a Fast Fourier Transform (FFT) operator 104, a data symbol extractor 106, an equalizer 108, a demodulator 110, a decoder 112, a pilot symbol extractor 114, and a channel estimator 116.

The RF processor 100 may include a front end unit and a filter, and operates to convert a high frequency band signal being past a wireless channel into a baseband signal, and output the baseband signal. The A/D converter 102 operates to convert the baseband analog signal into a digital signal and output the resultant signal. The FFT operator 104 conducts FFT operation with the data being received from the A/D converter 102, and outputs frequency domain data.

The pilot symbol extractor 114 extracts pilot symbols ($\hat{H}$) from the data being received from the FFT operator 104, and outputs the pilot symbols ($\hat{H}$). The channel estimator 116 may include at least two channel estimation filters (CEF) according to an aspect of the present invention. The channel estimator 116 may select the channel estimation filters adaptively according to the channel status, and filter the extracted pilot symbols with the selected channel estimation filter to acquire and output channel impulse response. The channel estimator 116 will be explained below with reference to FIG. 2.

The data symbol extractor 106 extracts data symbols from the data being received from the FFT operator 104 and outputs the extracted data symbols to the equalizer 108. The equalizer 108 conducts channel compensation of the data symbols being output from the data symbol extractor 106, using the channel impulse response ($\hat{H}$) being received from the channel estimator 116, and outputs the channel-compensated data. As a result, various distortions generated in the wireless channel are compensated before the data is output.

The demodulator 110 operates to demodulate the symbols being received from the equalizer 108 according to the modulation scheme used in the transmitter, and output the encoded data. The decoder 112 operates to decode the encoded data being received from the demodulator 110 according to the encoding used in the transmitter, and thus recovers the data into original form.

Figure 2:
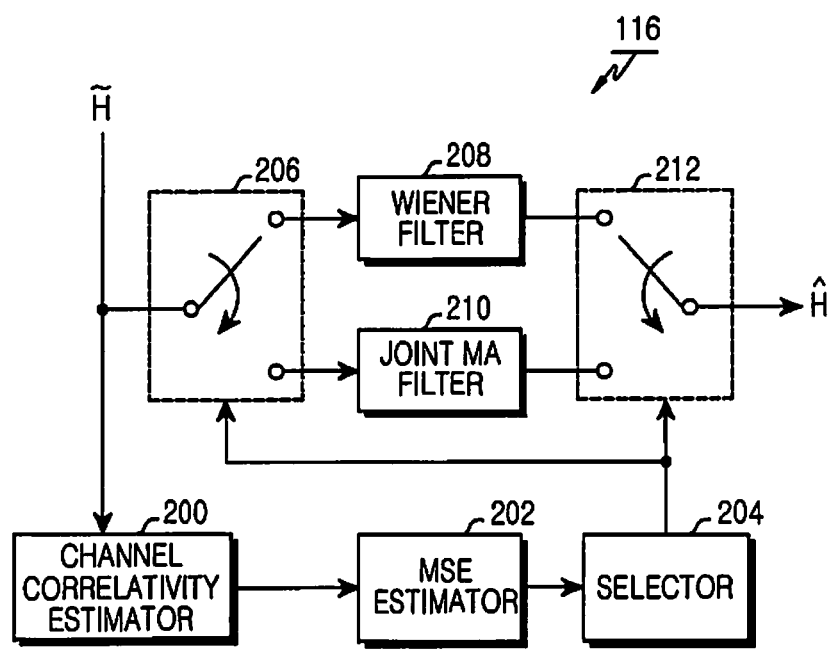
FIG. 2 illustrates a channel estimator according to the present invention.

FIG. 2 shows the channel estimator 116 according to the present invention.

Referring to FIG. 2, the channel estimator 116 may include a channel correlativity estimator 200, a Mean Square Error (MSE) estimator 202, a selector 204, a first switch 206, a Wiener filter 208, a joint Moving Average (MA) filter 210, and a second switch 212.

The channel correlativity estimator 200 computes channel correlativity with respect to a time axis and a frequency axis, using the pilot symbols of the pilot symbol extractor 114, and outputs the computed result. That is, the channel correlativity estimator 200 computes and outputs the channel correlativity for use in the Wiener filter 208 and the joint MA filter 210, respectively. According to general understanding, a rapidly-changing channel has a low correlativity, while a slow channel has a high correlativity.

The MSE estimator 202 computes an MSE (that is, estimated error of channel impulse response) of the Wiener filter 208, and an MSE of the joint MA filter 210, using the channel correlativity of the channel correlativity estimator 200, and outputs the computed results. The MSE may be computed by generally known processes, and for the sake of brevity, this will not be explained.

The selector 204 compares the two MSE of the MSE estimator 202 to select a smaller MSE, and generates a control signal to cause the filter corresponding to the smaller MSE to operate. In an implementation example, the Wiener filter 208 may be selected when the channel correlativity is low, and MA filter 210 may be selected when the channel correlativity is high. The first switch 206 is switched according to the control of the selector 204 to connect the pilot symbols of the pilot symbol extractor 114 to the Wiener filter 208 or the joint MA filter 210.

The Wiener filter 208 is a channel estimation filter, which operates in an environment where channel correlativity is low. The Wiener filter 208 operates to filter the pilot symbols being received from the first switch 206 according to the Wiener scheme to acquire channel impulse response ($\hat{H}$) of the entire sub-carriers, and output the acquired information. A short-tap Wiener filter may be desirably implemented as the Wiener filter 208, considering the complexity.

The joint MA filter 210 is another type of channel estimation filter, which operates in an environment where channel correlativity is high. The joint MA filter 210 conducts an initial filtering of the pilot symbols, using a linear interpolation filter, such as a Lagrange filter or a Spline filter, and conducts a second filtering using a MA filter to acquire channel impulse response ($\hat{H}$) of the entire sub-carriers and outputs the acquired information. The MA filter is used especially to remove excessive noise and interference after the linear interpolation. The number of taps for the MA filters may be adjusted adaptively, according to the channel environment, that is, according to the channel correlativity, and this may be expressed as shown in Equation (1):

$$(N_t N_f)_{opt} = \frac{1}{(d_t d_f)^{2/3}} \left( \frac{144\sigma_Z^2}{\left( \overline{w}_1^{(2)} \overline{w}_2^{(2)} + \sqrt{\overline{w}_1^{(4)} \overline{w}_2^{(4)}} \right)} \right)^{1/3} \quad (1)$$

where, $N_t$ and $N_f$ denote a number of time-axis taps and a number of frequency-axis taps, respectively, $d_t$ and $d_f$ denote pilot intervals in time and frequency axes, respectively, $\overline{w}_1^{(n)}$ and $\overline{w}_2^{(n)}$ denote Doppler profile and delay profile, respectively, and $\sigma_Z^2$ denotes noise power.

It can be understood from Equation (1) that an optimum number of taps for the joint MA filters 210 is determined, according to a signal-to-interference ratio (SIR), pilot intervals, the second and the fourth Doppler spectrums and power delay spectrum. If SIR is low, or moments of $\underline{w}_1^{(n)}$ and $\underline{w}_2^{(n)}$ are relatively low, in other words, when channel changes slow, more taps are used to achieve optimum performance, and otherwise, less number of taps may be used.

The second switch 212 is switched according to the control of the selector 204, to provide the equalizer 108 with an output (channel impulse response) of the Wiener filter 208 or the joint MA filter 210.

As explained above, according to the present invention, channel impulse response is computed, using the Wiener filter 208 having an appropriate number of taps when the channel has low correlativity, or using the joint MA filter 210 having optimum performance when the channel has high correlativity.

Figure 3:
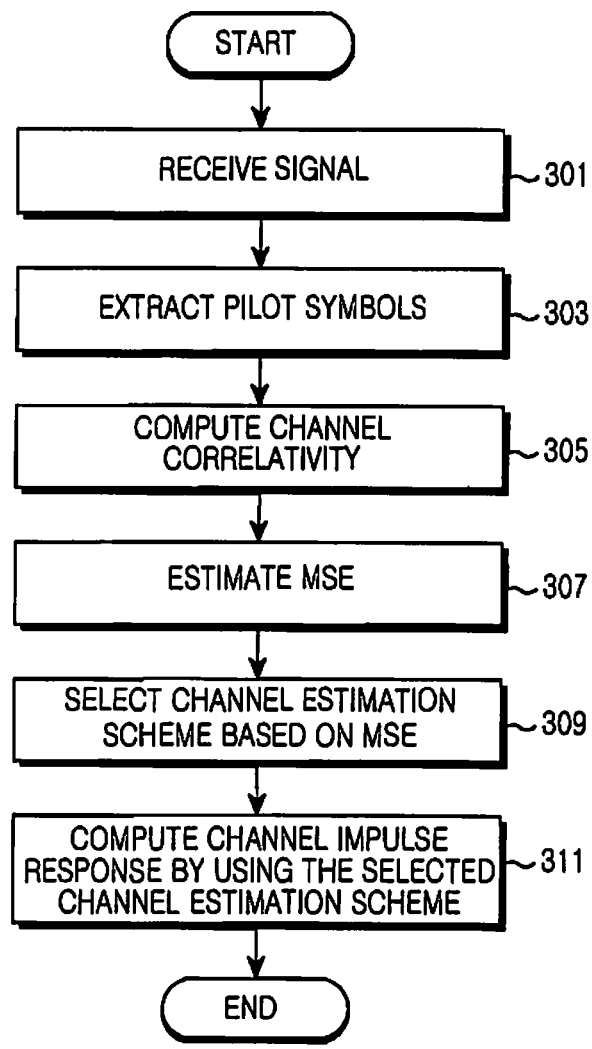
FIG. 3 is a flowchart illustrating a process of a receiver estimating a channel according to the present invention.

FIG. 3 shows a process of a receiver estimating the channel according to the present invention.

Referring to FIG. 3, the receiver receives signal from a transmitter in step 301, and extracts pilot symbols from the received signal for use in channel estimation in step 303.

The receiver then computes channel correlativity, using the extracted pilot symbols in step 305. The channel correlativity may be computed differently, according to whether the receiver uses the Wiener channel estimation or joint MA channel estimation.

The receiver computes channel estimation error (mean square error) of the respective channel estimation schemes, using the channel correlativity in step 307. The receiver compares the computed channel estimation errors to select a smaller error, and then selects a channel estimation scheme corresponding to the smaller error. For example, the Wiener channel estimation may be selected when the channel correlativity is low, and joint MA channel estimation may be selected when the channel correlativity is high.

Upon selection of the channel estimation scheme, the receiver proceeds to step 311 in which the receiver filters the extracted pilot symbols by the selected channel estimation scheme, to acquire channel impulse response to the entire sub-carriers. The channel impulse response is then used for the equalization of the data symbols.

Although the Wiener estimation filter is implemented as a filter of an adaptively-variable parameter, and the joint MA filter is implemented as a filter of a fixed parameter, this is only an example, and one will understand that other filters of similar characteristics may also be implemented according to the present invention.

The performance of the present invention will be compared with the conventional schemes as follows.

Experiments to measure the performance of the present invention have been conducted under conditions shown in Table 1.

TABLE 1

| Item | Values |
|---|---|
| Bandwidth | 100 MHz |
| OFDM symbol length | 20.48 μs(+5 μs: Guard Interval) |
| Number of entire sub-carriers | 2048 |
| Packet size | Number of time-domain symbols = 8, Number of sub-carriers = 64 |
| Pilot intervals | 6.25%($d_t$ = 8, $d_f$ = 4) |
| Carrier frequency | 5.8 GHz |
| Channel code | Zig-Zag code(code rate ½) |
| Doppler characteristics | Rayleigh-classic spectrum |
| Power delay characteristics | Exponentially decreasing distribution |

Figure 4:
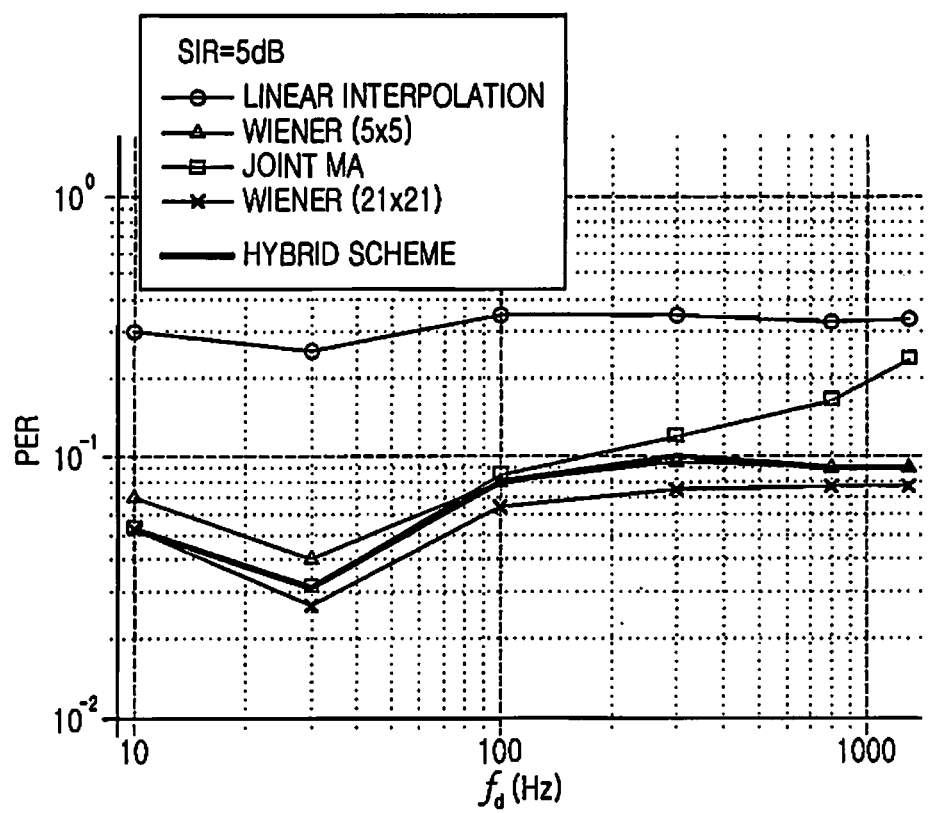
FIG. 4 is a graphical representation of a comparison of Packet Error Ratio (PER) between filters, according to a variation of maximum Doppler frequency ($f_d$) under a given square average power delay ($\tau_{max}$).

FIG. 4 shows a comparison of Packet Error Ratio (PER) between the filters, according to a variation of maximum Doppler frequency ($f_d$) under a given square average power delay ($\tau_{max}$).

As indicated by the graphical representation, the hybrid scheme according to the present invention provides similar performance in the entire region ($f_d$) as the 2-dimension (21× 21) Wiener scheme, which is known as the optimum channel estimation.

Furthermore, the experiment has proved that the hybrid scheme according to the present invention greatly reduced computational complexity as listed in Table 2 below.

TABLE 2

| Filter type (Number of filter taps) | Multiplications per symbol | | Matrix inverse operation |
|---|---|---|---|
| | Factor | Value | |
| 2 dimension Wiener (21 × 21) | $N_t N_f$ | 441 | 441 × 441 |
| 2 × 1 dimension Wiener (21 × 21) | $N_f/d_t + N_t$ | 23.625 | 21 × 21 |
| Present invention 2 × 1 dimension Wiener (5 × 5) | $N_f/d_t + N_t$ | 5.625 | 5 × 5 |
| joint MA | $(d_t^2 - 1)/d_t d_f + 1$ | 2.969 | None |

As explained above, according to the present invention, the joint MA channel estimation filter, which provides low system complexity and high-quality performance, is used when the channel changes slowly, while the Wiener channel estimation filter having an appropriate number of taps is used when the channel changes rapidly. As a result, a channel estimation is provided, which has high quality performance, and complexity is reduced to an appropriate level that is low enough to be realized in any channel status.

The present invention can also include computer readable codes on a computer readable medium. A computer readable medium can be any data storage device that can store data that can be read by a computer system. A computer readable medium can include, for example, magnetic storage media (such as, ROM, floppy disks, hard disks, among others), optical recording media (such as, CD-ROMs, or DVDs), storage mechanisms such as carrier waves (such as, transmission through the Internet), etc. A computer readable medium can also be distributed over network coupled computer systems so the computer readable code is stored and executed in a distributed fashion. Also, functional programs, codes, and code segments can be provided for accomplishing the present invention.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiving apparatus of a wireless access system, the apparatus comprising:
   a pilot symbol extractor for extracting pilot symbols from a data being received from a processor;
   a channel correlativity estimator for measuring channel correlativity with respect to a time axis and a frequency axis using the extracted pilot symbols;
   a first channel estimation filter having a tap coefficient which is channel-adaptively variable, the first channel estimation filter acquiring a channel impulse response by filtering received pilot symbols;
   a second channel estimation filter having at least a filter with a fixed tap coefficient, the second channel estimation filter acquiring a channel impulse response by filtering received pilot symbols; and
   a selector which selects one of the first channel estimation filter and the second channel estimation by comparing the channel correlativity with a threshold;
   wherein the second channel estimation filter is not operating if the first channel estimation filter is selected, and the first channel estimation filter is not operating if the second channel estimation filter is selected,
   wherein the first channel estimation filter is different from the second estimation filter.

2. The receiving apparatus of claim 1, wherein the first channel estimation filter includes a Wiener channel estimation filter.

3. The receiving apparatus of claim 1, wherein the second channel estimation filter acquires the channel impulse response by filtering the pilot symbols with a linear interpolation filter and subsequently filtering the pilot symbols with a Moving Average (MA) filter.

4. The receiving apparatus of claim 3, wherein the linear interpolation filter includes one of a Lagrange interpolation filter and a Spline interpolation filter.

5. The receiving apparatus of claim 3, wherein the MA filter has a number of taps which is adaptively-variable according to channel status.

6. The receiving apparatus of claim 3, wherein the MA filter has a number of taps which is variable as follows:

$$(N_t N_f)_{opt} = \frac{1}{(d_t d_f)^{2/3}} \left( \frac{144 \sigma_Z^2}{\left( \overline{w}_1^{(2)} \overline{w}_2^{(2)} + \sqrt{\overline{w}_1^{(4)} \overline{w}_2^{(4)}} \right)} \right)^{1/3}$$

where, $N_t$ and $N_f$ denote a number of time-axis taps and a number of frequency-axis taps, respectively, $d_t$ and $d_f$ denote pilot intervals in time and frequency axes, respectively, $\overline{w}_1^{(n)}$ and $\overline{w}_2^{(n)}$ denote a Doppler profile and a delay profile, respectively, and $\sigma_Z^2$ ; denotes noise power.

7. The receiving apparatus of claim 1, further comprising an equalizer which conducts equalization of received data symbols, using the channel impulse response being received from one of the first and the second channel estimation filter.

8. A receiving method of a receiver of a wireless access system, the method comprising:
   extracting pilot symbols from a data being received from an RF processor;
   measuring a channel correlativity with respect to a time axis and a frequency axis using the extracted pilot symbols in a channel estimator of the receiver;
   comparing the channel correlativity with a threshold;
   acquiring a channel impulse response in the channel estimator of the receiver by filtering received pilot symbols using a first channel estimation filter having a tap coefficient which is channel-adaptively variable when the channel correlativity is below the threshold; and
   acquiring a channel impulse response in the channel estimator of the receiver by filtering received pilot symbols using a second channel estimation filter having at least a filter with a fixed tap coefficient when the channel correlativity is above the threshold;
   wherein the second channel estimation filter is not operating if the first channel estimation filter is selected, and the first channel estimation filter is not operating if the second channel estimation filter is selected,
   wherein the first channel estimation filter is different from the second estimation filter.

9. The receiving method of claim 8, wherein the first channel estimation filter includes a Wiener channel estimation filter.

10. The receiving method of claim 8, wherein the acquiring the channel impulse response using the second channel estimation filter comprises:
    filtering the pilot symbols with a linear interpolation filter; and
    filtering the output from the linear interpolation filter with a Moving Average (MA) filter.

11. The receiving method of claim 8, wherein the linear interpolation filter includes one of a Lagrange interpolation filter and a Spline interpolation filter.

12. The receiving method of claim 8, wherein the MA filter has a number of taps which is adaptively-variable according to channel status.

13. The receiving method of claim 8, wherein the MA filter has a number of taps which is variable as follows:

$$(N_t N_f)_{opt} = \frac{1}{(d_t d_f)^{2/3}} \left( \frac{144 \sigma_Z^2}{\left( \overline{w}_1^{(2)} \overline{w}_2^{(2)} + \sqrt{\overline{w}_1^{(4)} \overline{w}_2^{(4)}} \right)} \right)^{1/3}$$

where, $N_t$ and $N_f$ denote a number of time-axis taps and a number of frequency-axis taps, respectively, $d_t$ and $d_f$ denote pilot intervals in time and frequency axes, respectively, $\overline{w}_1^{(n)}$ and $\overline{w}_2^{(n)}$ denote a Doppler profile and a delay profile, respectively, and $\sigma_Z^2$ ; denotes noise power.

14. The receiving method of claim 8, further comprising equalizing received data symbols, using the acquired channel impulse response.

15. A non-transitory computer-readable recording medium having recorded thereon a program for channel estimation in a receiver, the program comprising:
    a first code segment, for causing a device to extract pilot symbols from a data being received from an RF processor;
    a second code segment, for causing a device to measure a channel correlativity with respect to a time axis and a frequency axis using the extracted pilot symbols;
    a third code segment, for causing a device to compare the channel correlativity with a threshold;
    a forth code segment, for causing a device to acquire a channel impulse response by filtering received pilot symbols using a first channel estimation filter having a tap coefficient which is channel-adaptively variable, when the channel correlativity is below a threshold; and a fifth code segment, for causing a device to acquire a channel impulse response by filtering received pilot symbols using a second channel estimation filter having at least a filter with a fixed tap coefficient, when the channel correlativity is above the threshold;

wherein the second channel estimation filter is not operating if the first channel estimation filter is selected, and the first channel estimation filter is not operating if the second channel estimation filter is selected, wherein the first channel estimation filter is different from the second estimation filter.

* * * * *